(No Model.)
W. N. HARSEN.
DEVICE FOR SETTING, GAGING, &c., THE TEETH OF SAWS.
No. 387,875. Patented Aug. 14, 1888.
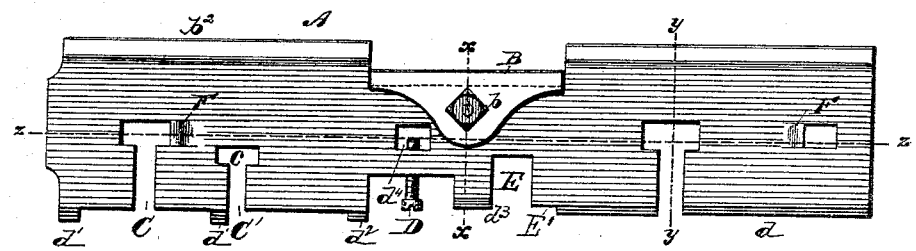
Fig. 1.
  Fig. 2.  
Fig. 3.
Fig. 4.
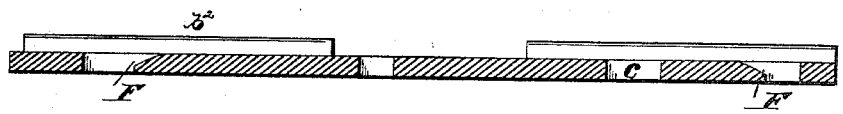
Fig. 5.
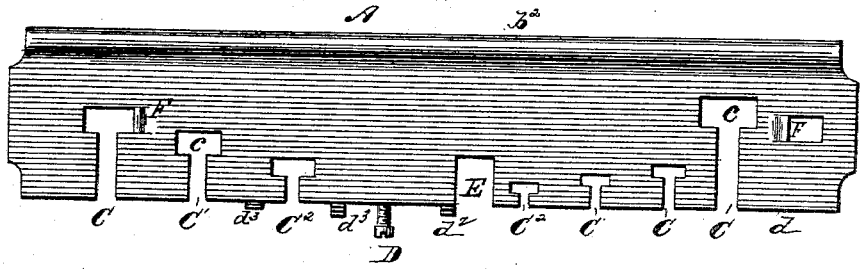
WITNESSES.
Samuel E. Thomas
M. B. O'Dogherty
INVENTOR.
William N. Harsen
By W. W. Legget,
Attorney.

UNITED STATES PATENT OFFICE.

WILLIAM N. HARSEN, OF DETROIT, MICHIGAN.

DEVICE FOR SETTING, GAGING, &c., THE TEETH OF SAWS.

SPECIFICATION forming part of Letters Patent No. 387,875, dated August 14, 1888.

Application filed December 1, 1887. Serial No. 256,683. (No model.)

*To all whom it may concern:*

Be it known that I, WILLIAM N. HARSEN, a citizen of the United States, residing at Detroit, county of Wayne, State of Michigan, have invented a certain new and useful Improvement in Sawyers' Combination-Tools; and I declare the following to be a full, clear, and exact description of the invention, such as will enable others skilled in the art to which it appertains to make and use the same, reference being had to the accompanying drawings, which form a part of this specification.

My invention consists of the combinations of devices and appliances hereinafter specified, and more particularly pointed out in the claims.

In the drawings, Figure 1 is a view in elevation of my combined tool. Fig. 2 is a cross-section of the same on the line $x\,x$; Fig. 3, a cross-section on the line $y\,y$; Fig. 4, a longitudinal section on the line $z\,z$. Fig. 5 is a variation in which the raker-gage is dispensed with.

My invention has for its object to combine in a simple and efficient tool which can be readily carried in the pocket, if desired, an implement designed for swaging the teeth of cross-cut and setting and gaging the teeth of circular saws; also, for setting the teeth, and jointing the same, with the raker-gage for dressing off the ends of the raker-teeth.

To this end, A represents my device, constructed of metal, preferably of malleable iron, gray iron, or steel.

B is the raker-gage, which consists of a plate, preferably chilled on its face and provided with a set-screw, $b$, which passes through an elongated slot, $b'$, to admit of the gage-plate B being raised or lowered.

$b^2$ is a projecting flange at the edge of the implement, the construction being such in this respect that the implement may be laid against the face of the saw with the flange $b^2$ resting on the upper edges of the teeth, and with the raker-gage adjusted in such position that by filing the raker-tooth down to the level of the gage they will be in proper relation to the fleam-teeth.

C C' C², &c., represent saw-sets, preferably enlarged at their inner ends, at $c$, in the usual way, to prevent their disturbing the point of the teeth. These sets may be of different sizes to accommodate saws of different thickness or to accommodate different degrees of set. There may be any number of these saw-sets that may be found desirable.

D is an adjustable saw-tooth gage. It is in the nature of a screw which may be run in or out to correspond with any particular set of the teeth, and the implement is provided with a straight-edge, $d$, so that when the tooth has been set the straight-edge may be laid on the face of the saw and the tooth be tested to see whether it conforms to this particular gage. Instead of the straight-edge $d$, there may be provided lugs $d'$, which, standing in proper line with each other, would be the equivalent of the straight-edge. So, also, in addition to the adjustable gage D, there may be stationary projecting lugs $d^2\,d^3$, of different heights, which lugs would constitute the gage, and by dressing them off with a file they might be made also to conform to any desired gage, and for the same reason the adjustable saw-gage D might itself be dispensed with and be made in the form of a stationary lug. It is apparent, however, that with stationary lugs to constitute the gage for the teeth there is no means of adjustment. I therefore prefer to have at least one adjustable gage D. So, also, I prefer that the screw which constitutes the adjustable gage shall pass into an opening, $d^4$, so that the tap may be run through into the opening, thus making a perfect thread for the screw to engage with.

E is the jointing-groove, adapted to receive the edge of the file and hold it level as the teeth are being evened up. It is my purpose that the file shall be held in place by hand, while the straight-edge of the implement is held against the face of the saw. In this way the jointing mechanism upon the implement itself is reduced to the presence of this groove E, there being no other mechanism to project over the implement, as is usual with cases where jointing mechanism is connected with such an implement.

F represent swages. The face of the swage is beveled, substantially as shown, so that when the point of the tooth is projected through the orifice and rests upon the beveled face of the swage a blow with a hammer or block of wood on the end of the implement A will swage over and properly shape the point of the cutting-teeth, thus giving them a slightly drawing cut, which sawyers usually prefer. There may be one or more of these swages F.

I would have it understood that I do not limit myself either to the number of swages upon the implement, or to the number of adjustable or stationary saw-tooth gages, or to the number or sizes of the saw-sets, since these may of course be varied in number without departing from my invention. So, also, the straight-edge $d$ may be made of thickness with the remainder of the tool A; but I prefer, generally, to bevel the metal at this edge, so that if at any time it is desired to dress the edge with a file it may be done without being obliged to dress off so large a quantity of metal as would be the case if it were full thickness. Moreover, by beveling the edge the implement is made lighter without detracting from its strength and utility. So, also, the tool might be made for use with circular saws without the required gage, and such a variation is shown in Fig. 5. In this case the upper flange, $b^2$, may be dispensed with; but in its place I would prefer, though not necessarily, to have the corresponding edge provided with a rounded portion, as shown, being easier to handle.

An implement made in the form described possesses the following marked advantages. It is very thin and has no projecting parts. For this reason it may be carried with comfort in the pocket. It also combines all the mechanism required for swaging, setting, joint-gaging, and raker-gaging, whereas other implements, especially such as have combined mechanism for jointing a required gage, have possessed inconvenient projecting parts, necessitating a cumbersome instrument which could not be carried in the pocket.

E' is a notch adjacent to the slot E, so that when the file is placed in the notch E, so as to rest upon the tooth of the saw with the tool against the face of the saw, the swaged edges of the tooth may be protected by projecting into the said notch as the file is carried over the tooth along the edge of the saw.

What I claim is—

1. A sawyer's implement made in flat form, consisting of a plate provided on one edge with a flange, $b^2$, said flange being recessed to admit the raker-gage B, and on the other edge with saw-sets, a jointer-groove, and an adjustable saw-tooth gage, consisting of a screw, D, moving in and out of a slot, $d^4$, all substantially as described.

2. A sawyer's implement provided with the flange $b^2$ and raker-gage B on one edge, and on the other edge with saw-sets, saw-tooth gages, a jointer-groove, and a swage, F, situated in the upper enlarged end of the saw-set C, substantially as described.

In testimony whereof I sign this specification in the presence of two witnesses.

WILLIAM N. HARSEN.

Witnesses:
M. B. O'DOGHERTY,
WM. H. WILLEBRANDS.